United States Patent [19]

Schirman

[11] 3,829,736
[45] Aug. 13, 1974

[54] REACTIVE ENERGY STATIC COMPENSATOR TO PROTECT THYRISTOR RECTIFIERS

[75] Inventor: Ananie Schirman, Brussels, Belgium

[73] Assignee: Ateliers de Constructions Electriques de Charleroi, Charleroi, Belgium

[22] Filed: Oct. 25, 1972

[21] Appl. No.: 300,705

[30] Foreign Application Priority Data
Oct. 25, 1971   Belgium.................................. 3510

[52] U.S. Cl. ... 317/33 SC, 317/36 TD, 317/DIG. 6, 323/8, 323/50, 323/85
[51] Int. Cl. ............................................. H02h 7/00
[58] Field of Search.... 317/14 B, 16, 33 SC, 36 TD, 317/DIG. 6; 323/6, 8, 50, 85, 87

[56] References Cited
UNITED STATES PATENTS
| | | | |
|---|---|---|---|
| 2,276,855 | 3/1942 | Meador | 317/14 B X |
| 3,436,600 | 4/1969 | Salo | 323/6 X |

FOREIGN PATENTS OR APPLICATIONS
358,083   9/1931   Great Britain....................... 323/87

*Primary Examiner*—Gerald Goldberg
*Attorney, Agent, or Firm*—Raymond A. Robic; David A. Blumenthal; Arthur Schwartz

[57] ABSTRACT

Inductive circuit apparatus having an iron core comprising at least one first winding connected to a network and a second winding connected to an equipment designed for a predetermined nominal voltage or current. The apparatus is characterized in that a diode, of the freewheeling type, is connected between the terminals of the second winding in such a manner as to short-circuit such winding for the induced current in the second winding, and in that an interrupting device, connected in series with the diode, is closed in the absence of voltage across the terminals of the first winding and is operated to open the circuit of the diode after the dampening of a transient current induced by the energization of the first winding.

10 Claims, 1 Drawing Figure

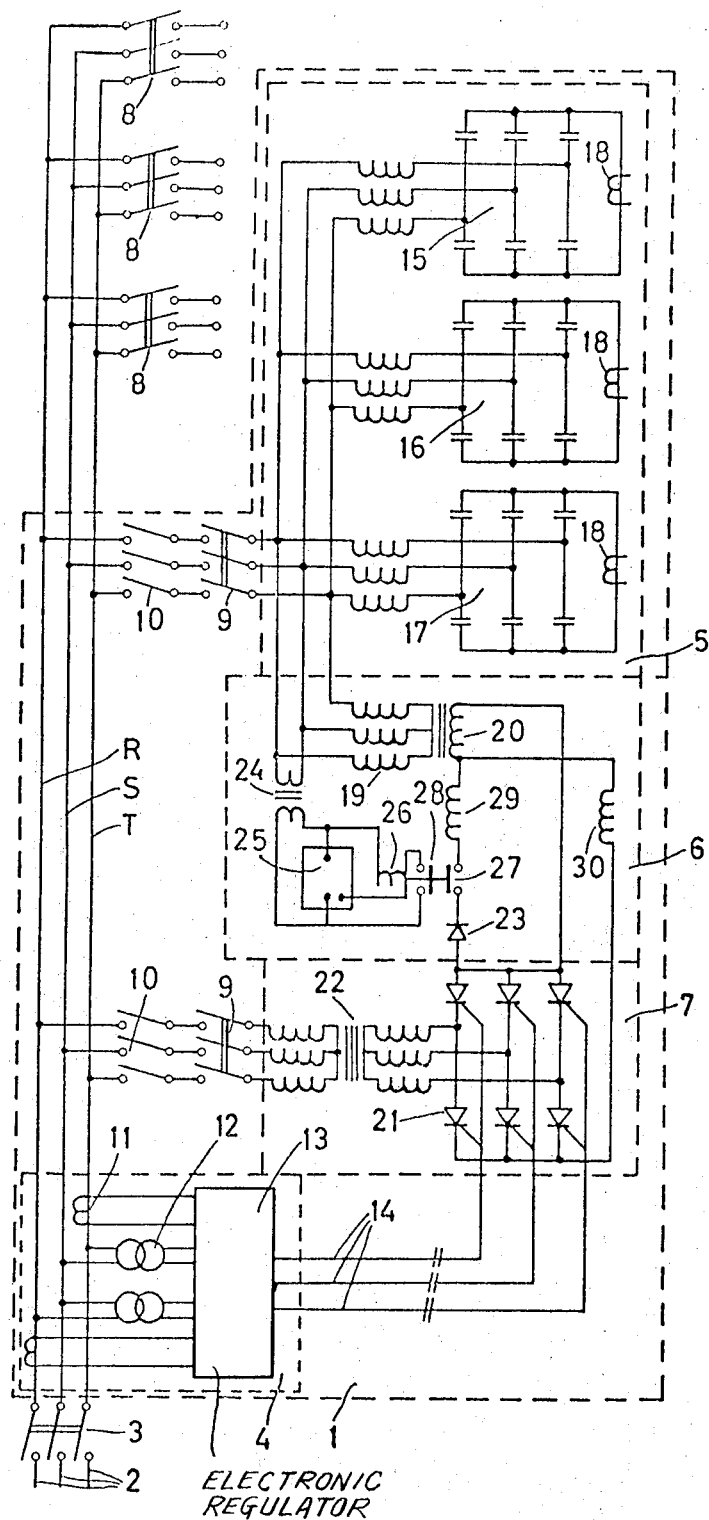

REACTIVE ENERGY STATIC COMPENSATOR TO PROTECT THYRISTOR RECTIFIERS

The present invention relates, in a general manner, to an inductive circuit apparatus having an iron core and comprising at least a first winding connected to a network and a second winding connected to an equipment designed for a predetermined nominal voltage or current.

More particularly, the present invention relates to a transducer comprising an iron core single phase or polyphase self inductor connected to a single phase or polyphase network, equipped with a control winding the terminals of which are connected to a D.C. source and a regulator connected to such D.C. source to control the current supplied by such source. When, in such a transducer, the control winding is fed from a D.C. source consisting of a rectifier assembly, such source must be protected against excessive voltages or current. This is more particularly necessary is the rectifying assembly is made of thyristors.

Transducers are known having a control winding connected to thyristor rectifiers. In such rectifiers, it has been noted that the thyristors have been destroyed by transient currents of high intensity. To overcome this drawback, a resistane is normally connected in parallel with such control winding. The resistance so connected permits to prevent the destruction of the thyristors or of other type of semiconductor rectifiers, but has the drawback of being an important and useless load for the rectifier, of increasing the time constant of the transducer and of consequently lenghtening its response time, which lowers greatly its effectiveness.

The object of the present invention is to eliminate the dangers resulting from a transient current for the equipment connected to the inductive circuit apparatus. It is characterized by a diode of the freewheeling type, connected between the terminals of the second winding in such a manner as to short-circuit such winding for the current induced in the second winding, and by an interrupting device connected in series with the diode, such device being closed in the absence of voltage across the terminals of the first winding and operated to open the circuit of the diode after dampening of the transient current induced by the energization of the first winding.

In the case in which the inductive circuit is a transducer, the inventor has noted that the transient currents were induced in the control winding only at the moment of the feeding of the alternative voltage to the first winding at the time of the closing of the circuit breaker. A remanent magnetization of the magnetic circuit of the transducer due to a preceding magnetization of such transducer seems to be the cause of the transient phenomenon; indeed, the transient currents are always in the same direction as the normal direction of the control current and the necessary precautions to protect the rectifiers must be taken only at the time of closing the circuit breaker, during the duration of the transient phenomenon of cancellation of the remanent magnetism.

The invention overcomes these drawbacks and reduces even more the danger of energization, by high transient currents, of the semiconductor rectifiers. It is characterized by a diode of the freewheeling type connected between the terminals of the control winding in such a manner as to short-circuit such control winding for the current induced in the control winding, and by an interrupting device, connected in series with the diode, such interrupting device being closed in the absence of voltage at the input of the transducer and operated to open the circuit of the diode after dampening of the transient current induced by the energization of the transducer.

The invention will now be disclosed, by way of example, with reference to an embodiment of a transducer incorporated in a reactive energy static compensator for an electric network the schematic diagram of which is illustrated in the accompanying drawing.

Static compensators using transducers are known per se and have been used lately to replace the conventional synchronous compensators because they present numerous advantages with respect to such conventional compensators.

The reactive energy static compensator in accordance with the invention is represented by an assembly of elements inside a frame 1 drawn in broken lines. It consists essentially of a set of bus-bars RST connected to a triphase network 2 through a main circuit breaker 3, of a measuring device 4 for measuring the reactive energy, of plural groups of condensers and reactances 5 adapted to compensate for the reactive energy and to the filtering of harmonics, of a transducer 6 to permit the variation of the compensation of the reactive energy, and by a D.C. source 7 acted upon by the measuring device 4 and controlling the amount of reactive energy absorbed by the transducer 6. The set of buss-bars R, S, T, is connected through suitable interrupters, for example, circuit breakers 8 to various electric energy utilization apparatus, not shown, fed by the network 2. Suitable interrupters, for example circuit breakers 9 and disconnecting switches 10, are provided for disconnecting from the bus-bars the groups of condensers and reactances 5, the transducer 6 and the D.C. current source 7.

The measuring device 4 comprises current transformers 11 and voltage transformers 12 by means of which it is possible to measure the reactive energy absorbed by the assembly of the utilization apparatus and by the compensator 1. The output voltages of the current and voltage transformers 11 and 12 respectively serve to calculate the values UI sin $\phi$ for the different phases. This calculation is done in a regulator 13 the output signals of which appearing on the conductors 14 are a function of the power factor of the network and are used to the control of the D.C. current source 7.

The group of condensers and reactances 5 is composed of plural harmonic filters, for example a first filter 15 whose resonant frequency $\omega$ is 250 Hz (harmonic of order 5 for a frequency of 50 Hz), of a second filter 16 for the harmonic of order 7 and of a third filter 17 for the harmonic of order 11. Each of these filters may include an arrangement of the battery of condensers as illustrated in the drawing permitting to detect an eventual unbalance by means of windings 18 of current transformers. Other measuring or control apparatus protecting the network 2 and the compensator 1, for example against excessive currents and voltages, may be provided but are not illustrated.

In parallel with the group of condensers and reactances 5 is placed a transducer 6 consisting of a triphase self inductor 19 having an iron core which may be saturated by means of a control winding 20. The control winding 20 is fed by a D.C. current provided by a D.C.

current source 7. Such source comprises a rectifier assembly consisting of thyristors 21 connected to the set of buss bars by means of a transformer 22. Such transformer 22 is required in the present example because the voltage of the buss bars is very high, for example 6,000 V. The thyristors 21, the number of which is equal to six, are controlled in function of the power factor of the network by the control voltages appearing on the conductors 14 connected to their control electrodes.

The above description applies to elements common to known static compensators and to the particular static compensator illustrated on the drawing. These compensators operate as follows:

The group of condensers and reactances consisting of the harmonic filters 15 to 17 exchanges harmonic currents with the utilization apparatus connected through the interrupters 8. These harmonic currents must not be provided by the network 2. The transducer 6 constitutes a variable inductive load for the network. It is controlled in such a manner that the total inductive load of the network varies within relatively low predetermined limits. To make the inductive load of the transducer vary at an inverse rate of the inductive charge of the electric energy utilization apparatus, the thyristors 21 are controlled by electronic regulator 13. This regulator elaborates the output signals which take into account the measured value of the reactive energy UI sin φ. Under the effect of the measure of the value of the ractive energy, the regulator 13 controls a rapid increase or decrease of the D.C. current provided by the thyristors 21. When the capacitive component of the current in the network reaches a value which determines capacitive power factor lower than the predetermined limit, the output signals of the regulator appearing on the conductors 14 cause the current provided by the thyristors 21 to increase until the time where the complementary inductive load so determined by the transducer brings the power factor back to the predetermined value. When the inductive load increases because of the electric energy utilization apparatus and that the capacitive power factor exceeds the predetermined value or even when the load becomes inductive, the current provided by the rectifiers decreases and, with it, the induced alternating current flowing through the threephase self inductor 19 of the transducer.

At the time of the operation of circuit breaker 3, if as it is generally the case, the disconnecting switches and circuit breakers 9 and 10 are closed, a relatively high transient current flows into the circuit of the control winding 20 and in the thyristors 21. The intensity of such transient current may reach values high enough to destroy the thyristors 21 if such current is permitted to flow through the transistors. In the known transducers, this drawback has been overcome by connecting a resistor in parallel across the control winding 20. However, such resistor has the drawback of being an additional important load for the rectifier and to increase the time response of the transducer.

In the example illustrated on the FIGURE and in accordance with the invention, a diode 23, of the freewheeling type, is connected between the terminals of the control winding 20 and oriented in such a manner as to short-circuit such winding for the current induced and the control winding. It has been noted that at the moment of closure of the circuit breaker 3, a high intensity transient current always flow in the normal direction of the control current. The diode 23 thus permits to shortcircuit the high transient currents and so protect the thyristors 21 without lowering the excitation current which must flow through the control winding 20. As soon as the transient phenomenon has disappeared, the diode 23 is of no utility and may be disconnected. This also applies to any other inductive circuit apparatus in which the invention may be used. To do so, a suitable interrupting device is connected in series with diode 23 between the terminals of control winding 20. This interrupting device must be operated after the dampening of the transient current. A particularly simple manner of obtaining such result consists in connecting the input of winding 19 of the transducer eventually through a transformer 24 a timer 25 and a relay having a winding 26, a normally closed contact 27 and a normally open contact 28. The normally closed contact 27 is connected in the circuit of the diode 23. The normally open conctact 28 is self-energizing contact for the winding 26. Upon the appearance of the voltage at the input of the self inductor 19, the timer counts a predetermined number of half waveforms and then energizes the winding 26 of the relay. Such winding remains energized through its own contact 28 until the voltage disappears at the input of the self inductor 19 of the transducer. Consequently, the contact 27 opens after a predetermined time counted from the energization of the self inductor 19 of the transducer. This time may reach, for example, a few seconds. In the case of other inductive circuit apparatus, this time may be as short as one or two half waves.

To protect the diode 23 against current peaks, a small self inductor 29 is placed in series with diode 23.

In the circuit of the thyristor rectifier 21 and of the control winding 20, a self inductor 30 having a value varying between 1 mH and 0.05 mH is desirable to protect the thyristors. However, this self inductor 30 is not required if the precautions are taken so that the circuit breaker 3 does not close at the time where the thyristors are operated.

I claim:

1. An inductive circuit apparatus for connection in parallel with a voltage network and a load comprising:

a first self-inductor having a first winding for connection in parallel to said network and load, and a second winding connected in a closed circuit path to a DC source, a diode connected to said DC source and said second winding, a circuit interrupting device connected in series with said diode, means for sensing voltage at said first winding, and interrupt control means connected to said voltage sensing means and said interrupting device for opening said interrupting device at a predetermined time after sensing a voltage at said first winding by said voltage sensing means, and for closing said interrupting device in the absence of voltage at said first winding.

2. An inductive circuit apparatus as recited in claim 1 wherein said network provides AC voltage wave forms and said interrupt control means comprises means for counting a predetermined number of wave forms.

3. An inductive circuit apparatus as recited in claim 2 wherein said second winding has two terminals and said diode is connected between one of said terminals and said DC source.

4. An inductive circuit apparatus as recited in claim 3 wherein said DC source comprises a thyristor rectifier assembly connected to said network.

5. An inductive circuit apparatus as recited in claim 1 wherein said first self-inductor is an iron core inductor.

6. An inductive circuit apparatus as recited in claim 1 wherein the diode is connected in series with a self-inductor.

7. An inductive circuit apparatus as recited in claim 1 wherein said interrupt control means comprises:
a timer connected to said voltage sensing means, and relay means having a relay winding connected to said timer and said interrupting device and said interrupting device comprises:
a first contact in series with said diode, said contact closed when said relay winding is not energized,
a second contact for self-energizing said relay winding, said second contact open when said relay winding is not energized,
whereby said second contact remains open and said first contact remains closed for a predetermined time as determined by said timer upon sensing a voltage by said voltage sensing means.

8. An inductive circuit apparatus as recited in claim 7 wherein said diode is connected in series with a second self-inductor wherein the closed first contact provides a closed path including said second winding, said second self-inductor, said diode and said first contact.

9. A reactive energy static compensator comprising:

a transducer connected in parallel with a voltage network, said transducer having a transducer current source, means for regulating said transducer current source, a reactive-condenser filter coupled in parallel to said network, said transducer comprising:
a first self-inductor having a first winding for connection in parallel to said network and load, and a second winding connected in a closed circuit path to a DC source,
a diode connected to said DC source and said second winding,
a circuit interrupting device connected in series with said diode,
means for sensing voltage at said first winding, and interrupt control means connected to said voltage sensing means and said interrupting device for opening said interrupting device at a predetermined time after sensing a voltage at said first winding by said voltage sensing means, and for closing said interrupting device in the absence of voltage at said first winding.

10. A reactive energy static compensator as recited in claim 9 wherein said means for regulating the transducer current source comprises a thyristor bridge rectifying network connected to said voltage network and said second winding.

* * * * *